(12) United States Patent
Huo et al.

(10) Patent No.: US 11,455,970 B2
(45) Date of Patent: Sep. 27, 2022

(54) INFORMATION CONFIGURATION METHOD AND ELECTRONIC APPARATUS

(71) Applicant: Lenovo (Beijing) Co., Ltd., Beijing (CN)

(72) Inventors: Bin Huo, Beijing (CN); Jianguo Xu, Beijing (CN); Yong Tan, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 103 days.

(21) Appl. No.: 16/912,970

(22) Filed: Jun. 26, 2020

(65) Prior Publication Data

US 2020/0410952 A1 Dec. 31, 2020

(30) Foreign Application Priority Data

Jun. 28, 2019 (CN) .......................... 201910578177.2

(51) Int. Cl.
*G09G 5/00* (2006.01)
*H04B 1/00* (2006.01)

(52) U.S. Cl.
CPC ......... *G09G 5/00* (2013.01); *G09G 2330/023* (2013.01); *G09G 2370/16* (2013.01); *H04B 1/006* (2013.01)

(58) Field of Classification Search
CPC .............................................. G09G 2330/023
See application file for complete search history.

(56) References Cited

U.S. PATENT DOCUMENTS

| 2006/0188003 | A1* | 8/2006 | Larsson | H04B 1/719 375/130 |
| 2008/0313691 | A1* | 12/2008 | Cholas | H04N 21/438 725/131 |
| 2019/0235571 | A1* | 8/2019 | Jang | H01Q 1/2291 |

FOREIGN PATENT DOCUMENTS

| CN | 102043518 A | 5/2011 |
| CN | 102386937 A | 3/2012 |
| CN | 105357033 A | 2/2016 |
| CN | 108111679 A | 6/2018 |
| CN | 109067429 A | 12/2018 |

* cited by examiner

*Primary Examiner* — Gustavo Polo
(74) *Attorney, Agent, or Firm* — Anova Law Group, PLLC

(57) ABSTRACT

An information configuration method includes transmitting a signal to a display of an electronic apparatus at a first transmission frequency, and, upon detecting that a current frequency band of the electronic apparatus is not in the first frequency band, switching the first transmission frequency to a second transmission frequency when the display is inactive. A parameter of the electronic apparatus associated with the first transmission frequency meets a predetermined condition when the electronic apparatus operates at a first frequency band. The parameter associated with the second transmission frequency meets the predetermined condition when the electronic apparatus operates at a second frequency band.

18 Claims, 1 Drawing Sheet

INFORMATION CONFIGURATION METHOD AND ELECTRONIC APPARATUS

CROSS-REFERENCE TO RELATED APPLICATION

This application claims priority to Chinese Patent Application No. 20190578177.2, filed on Jun. 28, 2019, the entire content of which is incorporated herein by reference.

TECHNICAL FIELD

The present disclosure generally relates to the communication field and, more particularly, to an information configuration method and an electronic apparatus.

BACKGROUND

As terminal equipment technology continues to develop, and a number of frequency bands included in a network continues to increase, when a terminal device uses a frequency to transmit signals to its display, it is difficult to avoid various frequency bands supported by the terminal device, thereby causing interference with normal operations of the terminal device at certain supported frequency band.

SUMMARY

In embodiments of the present disclosure, there is provided an information configuration method. The method includes transmitting a signal to a display of an electronic apparatus at a first transmission frequency, and, upon detecting that a current frequency band of the electronic apparatus is not in the first frequency band, switching the first transmission frequency to a second transmission frequency when the display is inactive. A parameter of the electronic apparatus associated with the first transmission frequency meets a predetermined condition when the electronic apparatus operates at a first frequency band. The parameter associated with the second transmission frequency meets the predetermined condition when the electronic apparatus operates at a second frequency band.

In embodiments of the present disclosure, there is provided an electronic apparatus, including a transmission circuit and a processor. The transmission circuit is configured to transmit a signal to a display of an electronic apparatus at a first transmission frequency. The processor configured to, upon detecting that a current frequency band of the electronic apparatus is not in the first frequency band, switch the first transmission frequency to a second transmitting frequency when the display is inactive. The parameter of the electronic apparatus associated with the first transmission frequency meets a predetermined condition when the electronic apparatus operates at a first frequency band. The parameter associated with the second transmission frequency meets the predetermined condition when the electronic apparatus operates at a second frequency band.

In embodiments of the present disclosure, there is provided a computer-readable medium. The computer-readable medium stores computer instructions that, when executed by a processor, cause the processor to transmit the signal to the display of the electronic apparatus at a first transmission frequency, and upon detecting a current frequency band of the electronic apparatus is not in the first frequency band, switch the first transmission frequency to a second transmitting frequency when the display is inactive. The parameter of the electronic apparatus associated with the first transmission frequency meets a predetermined condition when the electronic apparatus operates at a first frequency band. The parameter associated with the second transmission frequency meets the predetermined condition when the electronic apparatus operates at a second frequency band.

DETAILED DESCRIPTION OF THE EMBODIMENTS

Figure 1:
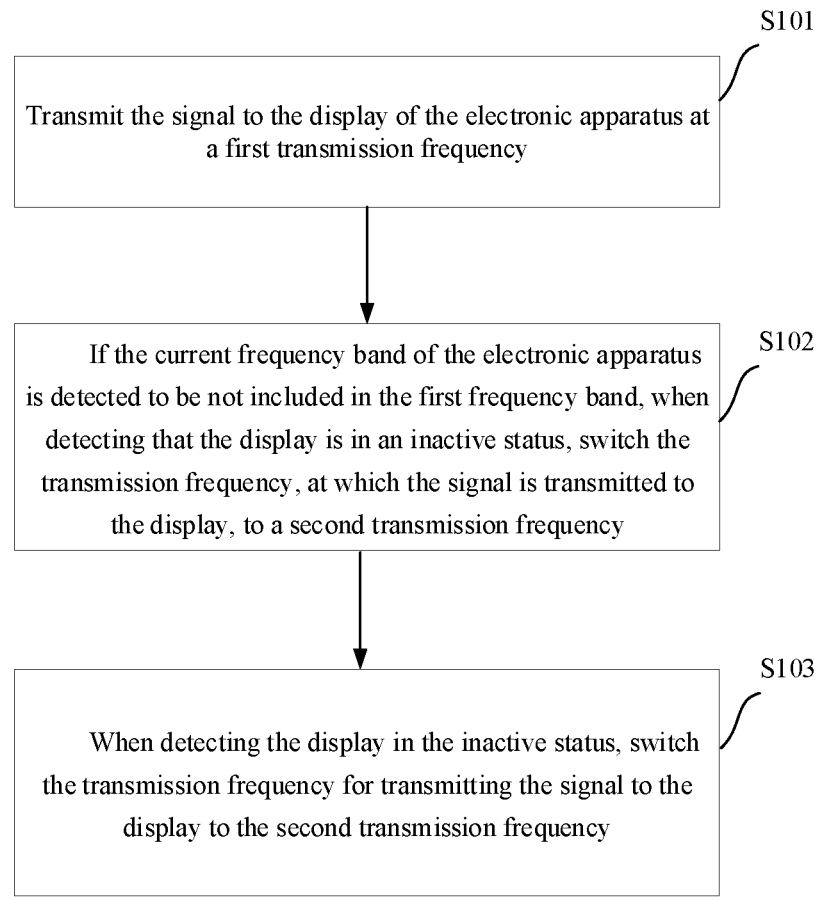
FIG. 1 illustrates a schematic flowchart of an information configuration method according to some embodiments of the present disclosure.
Figure 2:
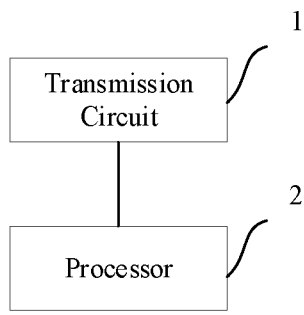
FIG. 2 illustrates a schematic block diagram of an electronic apparatus according to some embodiments of the present disclosure.

Embodiments of the present disclosure are further described in detail in connection with accompanying drawings, but description of embodiments is not used as a limitation to the present disclosure.

Various modifications may be performed on the present disclosure. Therefore, the following specification should not be considered as a limitation but only used as examples of embodiments. Those of skill in the art may think of other modifications within the scope and spirit of the present disclosure.

The drawings, which is included in and forms a part of the specification, illustrate embodiments of the present disclosure. The drawings are also used to explain principles of the present disclosure together with the general description of the present disclosure given above and the detailed description of embodiments given below.

These and other features of the present disclosure become apparent by the following description of preferred forms of embodiments provided as non-limiting examples with reference to the drawings.

Although the present disclosure is described with reference to some specific examples, those skilled in the art can surely implement many other equivalent forms of the present disclosure. The equivalent forms have the features as described in the claims and are therefore within the scope of the claims.

The above and other aspects, features, and advantages of the present disclosure become more apparent given the following detailed description when combined with the drawings.

Specific embodiments of the present disclosure are described with reference to the drawings. However, disclosed embodiments are merely examples of the present disclosure, which can be implemented in various methods. Well-known and/or repetitive functions and structures are not described in detail to avoid unnecessary or unnecessary details that may obscure the present disclosure. Therefore, the specific structural and functional details disclosed in the present disclosure are not intended to limit the present disclosure, but merely used as a basis for claims and a representative basis for teaching those skilled in the art to use the present disclosure in various ways of any suitable detailed structures.

This specification may use the phrases "in one embodiment," "in another embodiment," "in yet another embodiment," or "in other embodiments," which may all refer to one or more of the same or different embodiments according to the present disclosure.

Embodiments of the present disclosure provide an information configuration method. The information configuration method includes transmitting a signal to a display of an electronic apparatus at a first transmission frequency. The first transmission frequency may cause a parameter of the electronic apparatus to meet a predetermined condition when the electronic apparatus operates at the first frequency band of frequency bands supported by the electronic apparatus. The parameter may be a sensitivity-related parameter.

If a current frequency band of the electronic apparatus is detected to be not included in the first frequency band, the transmission frequency for transmitting the signal to the display is switched to a second transmission frequency when detecting that the display is in an inactive status. The second transmission frequency may cause the parameter of the electronic apparatus to meet the predetermined condition when the electronic apparatus operates at the second frequency band of the frequency bands supported by the electronic apparatus.

In the above-described technical solution, when the electronic apparatus transmits a signal to its display at the first transmission frequency, if the parameter of the electronic apparatus does not meet the predetermined condition at the frequency band corresponding to its current operation, the electronic apparatus switches the transmission frequency for transmitting the signal to the display automatically to the second transmission frequency when detecting the display in the inactive status. As such, the parameter of the electronic apparatus meets the predetermined condition at the frequency band corresponding to its current operation. Therefore, the electronic apparatus may switch the transmission frequency intelligently, at which the electronic apparatus transmits the signal to the display. The interference of the transmission frequency for transmitting the signal to the display on the electronic apparatus performance is reduced. As such, the corresponding parameter of the electronic apparatus operating at the frequency bands supported by the electronic apparatus can meet the predetermined condition. In addition, since the display is in the inactive status when the transmission frequency of the signal transmitted to the display is switched, the switching of the transmission frequency does not affect the use of the electronic apparatus for the user, or the user may not even be aware of it. Thus, the user experience is improved.

In some embodiments, the frequency at which the electronic apparatus (e.g., the processor of the electronic apparatus) transmits signals to the display may be referred as transmission frequency or operating frequency. For example, the transmission frequency may be a clock frequency of a MIPI display interface used in the electronic apparatus. The frequency band at which the antenna of the electronic apparatus operates may be referred as operating frequency band. The antenna of the electronic apparatus may support operations (e.g., sending and receiving data through mobile network) at a plurality of frequency bands.

To understand the above technical solution in detail, the above-described information configuration method is described in detail in conjunction with embodiments and the accompanying drawings.

FIG. 1 illustrates a schematic flowchart of an information configuration method according to some embodiments of the present disclosure.

At S101, the electronic apparatus transmits a signal to a display of the electronic apparatus at a first transmission frequency. The first transmission frequency may cause the parameter of the electronic apparatus to meet the predetermined condition when the electronic apparatus operates at the first frequency band of the frequency bands supported by the electronic apparatus. In other words, a parameter of the electronic apparatus associated with the first transmission frequency meets the predetermined condition when the electronic apparatus operates at the first frequency band. In some embodiments, the parameter when the electronic apparatus operates at the first frequency band of the frequency bands supported by the electronic apparatus may include a Desense index. The Desense index may be determined by a difference between a sensitivity of the electronic apparatus measured in a processing status (e.g., no other processes are running) and a sensitivity of the electronic apparatus measured with an interference. The predetermined condition may include a predetermined value range of the Desense index.

In some embodiments, before the electronic apparatus transmits the signal to the display at the first transmission frequency, the information configuration method also includes detecting corresponding parameters when the electronic apparatus transmits a signal to the display at different operating frequencies and when the electronic apparatus is in operation at any frequency band of a plurality of frequency bands supported by the electronic apparatus, and generating a mapping table corresponding to the operating frequencies and each frequency band supported by the electronic apparatus. In some embodiments, while operating under the first frequency band supported by the electronic apparatus, the electronic apparatus detects the corresponding parameter when transmitting the signal to the display at the first transmission frequency. The electronic apparatus may first transmit the signal to the display at the first transmission frequency, such that the electronic apparatus detects whether the parameter of the corresponding electronic apparatus at the first transmission frequency may meet the predetermined condition. If the parameter meets the predetermined condition, the electronic apparatus may also transmit the signal to the display at the first transmission frequency when the electronic apparatus operates at the second frequency band supported by the electronic apparatus. The electronic apparatus may also detect the parameter corresponding to the electronic apparatus when operating at the second frequency band. If the parameter still meets the predetermined condition at the second frequency band, the electronic apparatus may continue to transmit the signal to the display at the first transmission frequency when operating at the third frequency band supported by the electronic apparatus. The electronic apparatus detects the parameter corresponding to the electronic apparatus when operating at the third frequency band. By analogy, the electronic apparatus detects the parameter when operating at each of the frequency bands supported by the electronic apparatus.

If the electronic apparatus detects that the parameter of the corresponding electronic apparatus does not meet the predetermined condition when transmitting the signal to the display at the first transmission frequency and when operating at the second frequency band, the electronic apparatus needs to switch the operating frequency for transmitting the signal to the display. The electronic apparatus detects whether the parameter of the corresponding electronic apparatus meets the predetermined condition at the second transmission frequency when switching the operating frequency to the second transmission frequency. If the detected parameter at the second transmission frequency meets the predetermined condition, the electronic apparatus continues to transmit the signal to the display at the second transmission frequency. The electronic apparatus also detects the corresponding parameter of the electronic apparatus while operating at any of the frequency bands other than the first and second frequency bands. If the parameter still meets the predetermined condition, the electronic apparatus continues to detect the parameter of the electronic apparatus operating in any of undetected frequency bands of the frequency bands supported by the electronic apparatus. When the corresponding parameter does not meet the predetermined condition, the electronic apparatus first switches the transmission for transmitting the signal to the display from the second transmission frequency to the first transmission frequency and detects whether the predetermined condition is met. That is, minimize the setting of the number of transmission frequencies for transmitting the signal to the display to facilitate subsequent operations. However, in some embodiments, when the electronic apparatus transmits a signal to the display at the first transmission frequency or the second transmission frequency, none of the parameters of the electronic apparatus operating at the corresponding frequency bands meet the predetermined condition. In this case, the electronic apparatus can still switch the transmission frequency for transmitting the signal to the display to a transmission frequency other than the first transmission frequency or the second transmission frequency. The electronic apparatus then may re-detect the parameter at the switched transmission frequency while operating at the frequency bands supported by the detected electronic apparatus, to ultimately reduce the number of the transmission frequencies for transmitting the signal to the display to the minimum. That is, the transmission frequencies are reduced to a minimum number, possibly to only include the first transmission frequency and the second transmission frequency, and a mapping table is finally generated.

The mapping table is shown in Table 1.

TABLE 1

(M and N are different positive integers)

| | |
|---|---|
| The first transmission frequency | The first frequency band |
| The first transmission frequency | The third frequency band |
| The first transmission frequency | The fourth frequency band |
| The first transmission frequency | The M-th frequency band |
| The second transmission frequency | The second frequency band |
| The second transmission frequency | The fifth frequency band |
| The second transmission frequency | The sixth frequency band |
| The second transmission frequency | The N-th frequency band |

In some embodiments, after generating the mapping table of the operating frequency corresponding to each of the frequency bands supported by the electronic apparatus, the method further includes selecting the first transmission frequency or the second transmission frequency based on the mapping table. The parameter of the electronic apparatus transmitting the signal to the display at the first transmission frequency under the first frequency band of the frequency bands supported by the electronic apparatus indicates higher sensitivity than that at the second transmission frequency under the first frequency band. For example, the parameter corresponding to the first transmission frequency indicate higher sensitivity than the parameter corresponding to the second transmission frequency. The parameter of the electronic apparatus transmitting the signal to the display at the second transmission frequency when operating under the second frequency band of the frequency bands supported by the electronic apparatus indicates higher sensitivity than that at the first transmission frequency when operating under the second frequency band. In some embodiments, the electronic apparatus may set the transmission frequency for transmitting the signal to the display to the first transmission frequency corresponding to the first frequency band and the second frequency corresponding to the second frequency band of the supported frequency bands supported by the electronic apparatus. The first frequency band and the second frequency band of the electronic apparatus may cover all the frequency bands supported by the electronic apparatus.

At S102, if the current frequency band of the electronic apparatus is detected to be not included in the first frequency band, when detecting that the display is in an inactive status, the transmission frequency, at which the signal is transmitted to the display, is switched to a second transmission frequency. The second transmission frequency may cause the parameter of the electronic apparatus to meet the predetermined condition when the electronic apparatus operates at the second frequency band of the supported frequency bands. The first frequency band may include a plurality of sub-frequency-bands. For example, the first frequency band may include a first sub-frequency-band, a second sub-frequency-band, etc.

In some embodiments, detecting the current frequency band of the electronic apparatus to be not in the first frequency band includes detecting the transmission frequency corresponding to the current frequency band of the electronic apparatus to be different from the operating frequency corresponding to the current frequency band in the mapping table. In some embodiments, when the electronic apparatus transmits a signal to the display at the first transmission frequency, according to the generated mapping table, the frequency band corresponding to the first transmission frequency is the first frequency band that causes the electronic apparatus to have a parameter indicating higher sensitivity. As such, by comparing the current frequency band of the electronic apparatus with the first frequency band corresponding to the first transmission frequency in the mapping table, whether the current frequency band of the electronic apparatus is in the first frequency band. When the current frequency band of the electronic apparatus is not in the first frequency band, that is, the transmission frequency is different from the operating frequency at the first frequency band, perform the process S103. In some embodiments, the above-described mapping table may be shown in form of Table 2.

TABLE 2

(where M and N are different positive integers)

| | | |
|---|---|---|
| The first transmission frequency | The first sub-frequency-band | The first frequency band |
| The first transmission frequency | The second sub-frequency-band | |
| The first transmission frequency | The third sub-frequency-band | |
| The first transmission frequency | The M-th sub-frequency-band | |
| The second transmission frequency | The fourth sub-frequency-band | The second frequency band |
| The second transmission frequency | The fifth sub-frequency-band | |
| The second transmission frequency | The sixth sub-frequency-band | |
| The second transmission frequency | The N-th sub-frequency-band | |

In some embodiments, before detecting that the current frequency band of the electronic apparatus is not in the first frequency band, the method further includes, upon detecting that the frequency band used by the electronic apparatus is changed, detecting whether the frequency band used by the electronic apparatus after the change is in the first frequency band. In some embodiments, when the frequency band used by the electronic apparatus is switched from one sub-frequency-band of the frequency bands supported by the electronic apparatus to another sub-frequency-band, the switching of the frequency band may be detected. As such, a self-frequency band after the change of the electronic apparatus may be detected based on the change of the frequency band. If the sub-frequency band before the change and the sub-frequency band after the change are all in the first frequency band, the electronic apparatus does not need to change the transmission frequency for transmitting the signal to the display. If the sub-frequency band after the change is not in the range of the first frequency band, the electronic apparatus has a parameter indicating higher sensitivity when the first transmission frequency currently for transmitting the signal to the display of the electronic apparatus may not cause the electronic apparatus to operate at the sub-frequency band after the change. As such, the electronic apparatus needs to switch the first transmission frequency currently used for transmitting the signal to the display, then the process S103 needs to be performed.

At S103, when detecting the display in the inactive status, the electronic apparatus switches the transmission frequency for transmitting the signal to the display to the second transmission frequency. The second transmission frequency may cause the parameter to meet the predetermined condition when the electronic apparatus operates at the second frequency band of the frequency bands supported by the electronic apparatus. The inactive status of the display includes at least a non-displaying status, such as being in a black screen status.

In some embodiments, if the electronic apparatus detects the display to be in the inactive status, switching the transmission frequency for transmitting the signal to the display to the second transmission frequency includes, if the electronic apparatus detects an active operation capable of causing the display to enter the inactive status, the electronic apparatus switches the transmission frequency for transmitting the signal to the display to the second transmission frequency when a duration of the display entering the inactive status meets a predetermined duration. In some embodiments, when the electronic apparatus causes the display to enter the inactive status through the active operation, the user may re-activate the display through an active operation. For example, when users use a cell phone, after the screen is locked through a power button, some users may immediately activate the display screen by pressing the power button again. At this time, a predetermined duration may be set to avoid changing transmission frequency when the user performs the above-described operation. For example, the predetermined duration may be set to 5 s. After the users locked the cell phone through the power button, most of the users may not touch the cell phone for a while, if they do not active the display screen through the power button in 5 s. As such, the electronic apparatus may complete switching the transmission frequency for transmitting the signal to the display to the second transmission frequency after the duration of the display entering the inactive status meets the predetermined duration.

In some embodiments, if the electronic apparatus detects the display to be in the inactive status, switching the transmission frequency for transmitting the signal to the display to the second transmission frequency further includes, if the electronic apparatus does not detect the active operation that triggers the display to enter the inactive status, switching the transmission frequency for transmitting the signal to the display to the second transmission frequency. In some embodiments, if the electronic apparatus does not detect the active operation when the display enters the inactive status, the display enters the inactive status automatically. That is, the user does not perform any operation on the display of the electronic apparatus. In other words, the user does not pay too much attention to the display of the electronic apparatus at this time. Therefore, the electronic apparatus may directly complete the operation of switching the transmission frequency for transmitting the signal to the display to the second transmission frequency.

Embodiments of the present disclosure also provide an electronic apparatus including a transmission circuit 1 and a processor 2. The transmission circuit 1 is configured to transmit the signal to the display of the electronic apparatus at the first transmission frequency. The first transmission frequency may cause the parameter to meet the predetermined condition when the electronic apparatus operates at the first frequency band of the frequency bands supported by the electronic apparatus. The processor 2 is configured to switch the transmission frequency for transmitting the signal to the display to the second transmission frequency when detecting the current frequency band of the electronic apparatus to be not included in the first frequency band and detecting the display to be in the inactive status. The second transmission frequency may cause the parameter to meet the predetermined condition when the electronic apparatus operates in the second frequency band of the frequency bands supported by the electronic apparatus.

In some embodiments, the processor 2 may further be configured to, when the electronic apparatus is in operation in any of the plurality of different frequency bands supported by the electronic apparatus to transmit the signal to the display at different operating frequencies, detect the corresponding parameters, and generate the mapping table with the operating frequency corresponding to each frequency band supported by the electronic apparatus.

In some embodiments, the processor 2 is further configured to select the first transmission frequency and the second transmission frequency based on the mapping table. The parameter of the electronic apparatus transmitting the signal to the display at the first transmission frequency under the first frequency band of the frequency bands supported by the electronic apparatus is better than that at the second transmission frequency under the first frequency band. For example, the parameter corresponding to the first transmission frequency indicate higher sensitivity than the parameter corresponding to the second transmission frequency. The parameter of the electronic apparatus transmitting the signal to the display at the second transmission frequency when operating under the second frequency band of the frequency bands supported by the electronic apparatus indicates higher sensitivity than that at the first transmission frequency when operating under the second frequency band.

In some embodiments, the processor 2 is configured to detect the current frequency band of the electronic apparatus to be not in the first frequency band. In some embodiments, the processor 2 is configured to detect the transmission frequency corresponding to the current frequency band of the electronic apparatus to be different from the operating frequency corresponding to the current frequency band in the mapping table.

In some embodiments, the processor 2 is further configured to, if detecting a change of the current frequency band of the electronic apparatus, detect whether the frequency band used by the electronic apparatus after the change is in the first frequency band.

In some embodiments, the processor 2 is configured to, if detecting the active operation is capable of causing the display to enter the inactive status, switch the transmission frequency for transmitting the signal to the display to the second transmission frequency when the duration of the display entering the inactive status meets the predetermined duration.

In some embodiments, the processor 2 is configured to, if detecting no active operation when the display enters the inactive status, switch the transmission frequency for transmitting the signal to the display to the second transmission frequency.

Since the electronic apparatus described in embodiments corresponds to the information configuration method in embodiments of the present disclosure, based on the information configuration method, those skilled in the art may understand the specific implementation of the electronic apparatus in embodiments of the present disclosure and various variations thereof. Therefore, the electronic apparatus is not described in detail here. The electronic apparatus is within the scope of the present disclosure, as long as those skilled in the art implement the information configuration method of the present disclosure in electronic devices.

The skills in the art should understand that embodiments of the present disclosure may be provided as a method, a system, or a computer program product. Therefore, the present disclosure may adopt the form of entire hardware embodiments, entire software embodiments, and embodiments combining software and hardware. Further, the present disclosure may use the form of a computer program product implemented on one or more computer-readable storage media (including but not limited to disk storage, CD-ROM, optical storage, etc.) containing computer-readable program code.

The present disclosure is described with reference to flowcharts and/or block diagrams of methods, apparatuses (systems), and computer program products according to some embodiments. Each flow and/or block in the flowchart and/or block diagram and a combination of the flow and/or block in the flowchart and/or block diagram may be implemented by computer program instructions. The computer program instructions may be provided to the processing module of a general-purpose computer, special-purpose computer, embedded processing machine, or other programmable data processing device to generate a machine. As such, an apparatus is generated by the processing module of the computer or other programmable data processing device executing the instructions. The apparatus is configured to implement the functions indicated by one flow or a plurality of flows of a flowchart and/or one block or a plurality of blocks of the block diagram.

The computer program instructions may also be stored in a computer-readable memory that can guide a computer or other programmable data processing device to work in a specific method. The computer program instructions may also cause the instructions stored in the computer-readable memory to produce a product including an instruction device. The instruction device may realize specific functions indicated in one or more flows of the flowchart and/or one or more blocks of the block diagram.

The computer program instructions may be installed at the computer or other programmable data processing devices to cause the computer or other programmable data processing devices to perform a series of operational processes to realize computer processing. Therefore, the instructions executed on the computer or other programmable devices provide the processes for implementing the functions specified in one or more flows of the flowchart and/or one or more blocks of the block diagram.

Above-described embodiments are merely examples and are not used to limit the present disclosure. The scope of the present disclosure is not defined by claims. For those skilled in the art, various modifications or equivalent replacements can be made to the above-described embodiments. These modifications and equivalent replacements are also within the scope of the present disclosure.

What is claimed is:

1. An information configuration method, comprising:
   transmitting a signal to a display of an electronic apparatus at a first transmission frequency, wherein a parameter of the electronic apparatus associated with the first transmission frequency meets a predetermined condition when the electronic apparatus operates at a first frequency band;
   upon detecting that a current frequency band of the electronic apparatus is not in the first frequency band:
   switching the first transmission frequency to a second transmission frequency when the display is inactive, including when detecting an active operation when the display enters the inactive status, the parameter associated with the second transmission frequency meets the predetermined condition when the electronic apparatus operates at a second frequency band.

2. The method of claim 1, wherein before transmitting the signal to the display at the first transmission frequency, the method further comprises:
   detecting parameters associated with a plurality of transmission frequencies of transmitting the signal to the display when the electronic apparatus operates at any frequency band of frequency bands supported by the electronic apparatus; and
   generating a mapping table of the transmission frequencies corresponding to each of the frequency bands supported by the electronic apparatus.

3. The method of claim 2, further comprising:
   selecting the first transmission frequency and the second transmission frequency based on the mapping table; and
   wherein:
   a first parameter of the electronic apparatus transmitting the signal to the display at the first transmission frequency when operating at the first frequency band indicates higher sensitivity than a second parameter of the electronic apparatus transmitting the signal to the display at the second transmission frequency when operating at the first frequency band.

4. The method of claim 3, wherein detecting the current frequency band of the electronic apparatus is not in the first frequency band includes:
   detecting a transmission frequency corresponding to the current frequency band of the electronic apparatus to be different from an operating frequency corresponding to the current frequency band in the mapping table.

5. The method of claim 1, wherein before detecting the current frequency band of the electronic apparatus is not in the first frequency band, the method further comprising:
   upon detecting a change of a frequency band is used by the electronic apparatus, detecting whether the frequency band used by the electronic apparatus is at the first frequency band after the change.

6. The method of claim 1, wherein upon detecting the display is in the inactive status, switching the first transmission frequency to the second transmission frequency includes:
upon detecting an active operation is capable of causing the display to enter the inactive status, switching the first transmission frequency to the second transmission frequency when a duration of the display enters the inactive status meets a predetermined duration.

7. An electronic apparatus, comprising:
a transmission circuit configured to transmit a signal to a display of an electronic apparatus at a first transmission frequency, wherein a parameter of the electronic apparatus associated with the first transmission frequency meets a predetermined condition when the electronic apparatus operates at a first frequency band; and
a processor configured to, upon detecting that a current frequency band of the electronic apparatus is not in the first frequency band, switch the first transmission frequency to a second transmitting frequency when the display is inactive, including when detecting an active operation when the display enters the inactive status, wherein the parameter associated with the second transmission frequency meets the predetermined condition when the electronic apparatus operates at a second frequency band.

8. The electronic apparatus of claim 7, wherein the processor is further configured to:
detect a parameter associated with a plurality of transmission frequencies of transmitting the signal to the display when the electronic apparatus operates at any frequency band of frequency bands supported by the electronic apparatus; and
generate a mapping table of the transmission frequencies corresponding to each of the frequency bands supported by the electronic apparatus.

9. The electronic apparatus of claim 8, wherein the processor is further configured to:
select the first transmission frequency and the second frequency based on the mapping table; and
wherein:
a first parameter of the electronic apparatus transmitting the signal to the display at the first transmission frequency when operating at the first frequency band indicates higher sensitivity than a second parameter of the electronic apparatus transmitting the signal to the display at the second transmission frequency when operating at the first frequency band.

10. The electronic apparatus of claim 9, wherein the processor is further configured to:
detect a transmission frequency corresponding to the current frequency band of the electronic apparatus to be different from an operating frequency corresponding to the current frequency band in the mapping table.

11. The electronic apparatus of claim 7, wherein the processor is further configured to:
upon detecting a change of a frequency band is used by the electronic apparatus, detect whether the frequency band used by the electronic apparatus is at the first frequency band after the change.

12. The electronic apparatus of claim 7, wherein processor is further configured to:
upon detecting an active operation is capable of causing the display to enter the inactive status, switch the first transmission frequency to the second transmission frequency when a duration of the display enters the inactive status meets a predetermined duration.

13. A non-transitory computer-readable medium storing computer instructions that, when executed by a processor, cause the processor to:
transmit the signal to the display of the electronic apparatus at a first transmission frequency, wherein a parameter of the electronic apparatus associated with the first transmission frequency meets a predetermined condition when the electronic apparatus operates at a first frequency band; and
upon detecting a current frequency band of the electronic apparatus is not in the first frequency band:
switch the first transmission frequency to a second transmitting frequency when the display is inactive, including when detecting an active operation when the display enters the inactive status, wherein the parameter associated with the second transmission frequency meets the predetermined condition when the electronic apparatus operates at a second frequency band.

14. The non-transitory computer-readable medium of claim 13, wherein the instructions cause the processor to:
detect a parameter associated with a plurality of transmission frequencies of transmitting the signal to the display when the electronic apparatus operates at any frequency band of frequency bands supported by the electronic apparatus; and
generate a mapping table with the transmission frequencies corresponding to each of the frequency bands supported by the electronic apparatus.

15. The non-transitory computer-readable medium of claim 14, wherein the instructions cause processor to:
select the first transmission frequency and the second frequency based on the mapping table; and
wherein:
a first parameter of the electronic apparatus transmitting the signal to the display at the first transmission frequency when operating at the first frequency band indicates higher sensitivity than a second parameter of the electronic apparatus transmitting the signal to the display at the second transmission frequency when operating at the first frequency band.

16. The non-transitory computer-readable medium of claim 15, wherein the instructions cause the processor to:
detect a transmission frequency corresponding to the current frequency band of the electronic apparatus to be different from an operating frequency corresponding to the current frequency band in the mapping table.

17. The non-transitory computer-readable medium of claim 13, wherein the instructions cause the processor to:
upon detecting a change of a frequency band is used by the electronic apparatus, detect whether the frequency band used by the electronic apparatus at the first frequency band after the change.

18. The non-transitory computer-readable medium of claim 13, wherein the instructions cause the processor to:
upon detecting an active operation is capable of causing the display to enter the inactive status, switch the first transmission frequency to the second transmission frequency when a duration of the display enters the inactive status meets a predetermined duration.

* * * * *